Feb. 4, 1958     A. J. MAZZIO ET AL     2,821,910
MASTER EJECTING MECHANISM FOR DUPLICATORS

Filed May 10, 1954     6 Sheets-Sheet 1

INVENTORS:
Anthony J. Mazzio,
George P. Wiesen,
George E. Engelstad
and Edgar H. DuBois,
BY
Coons, McDougall, Williamson & Hersh,
ATTORNEYS.

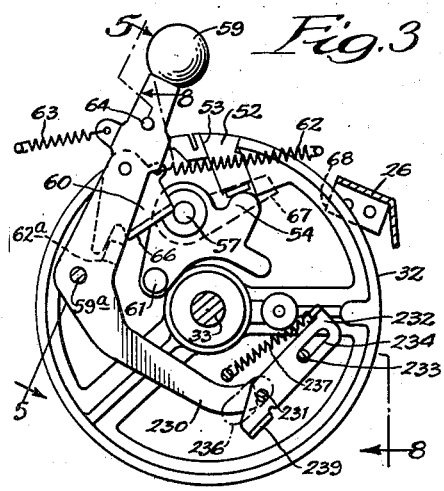
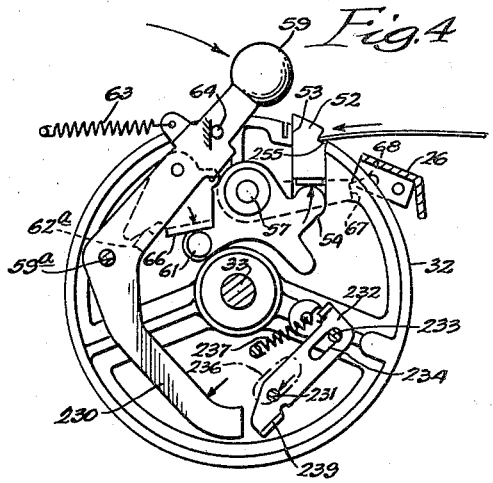
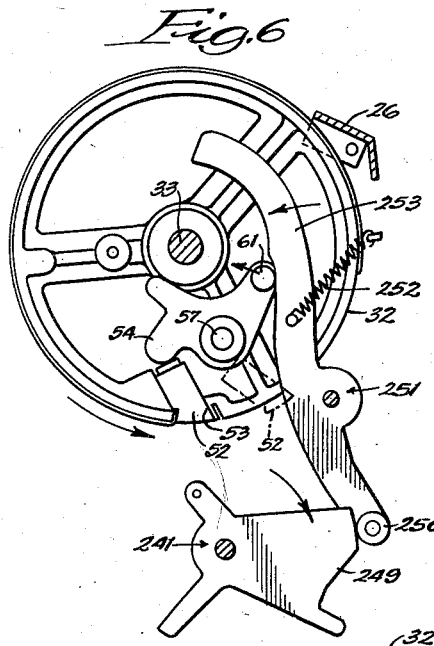
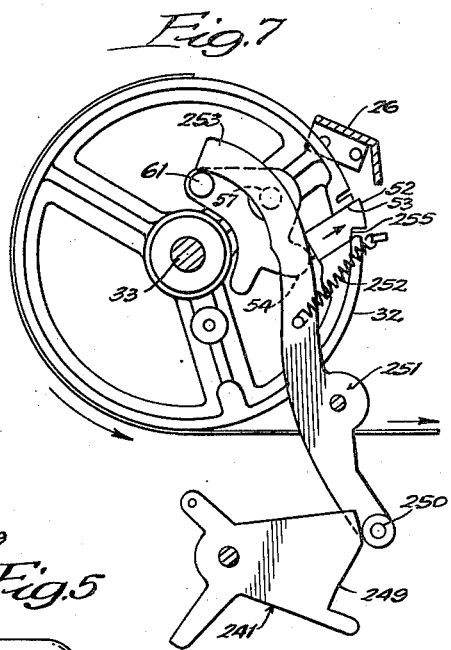
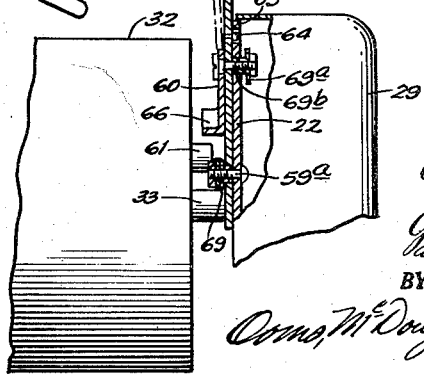

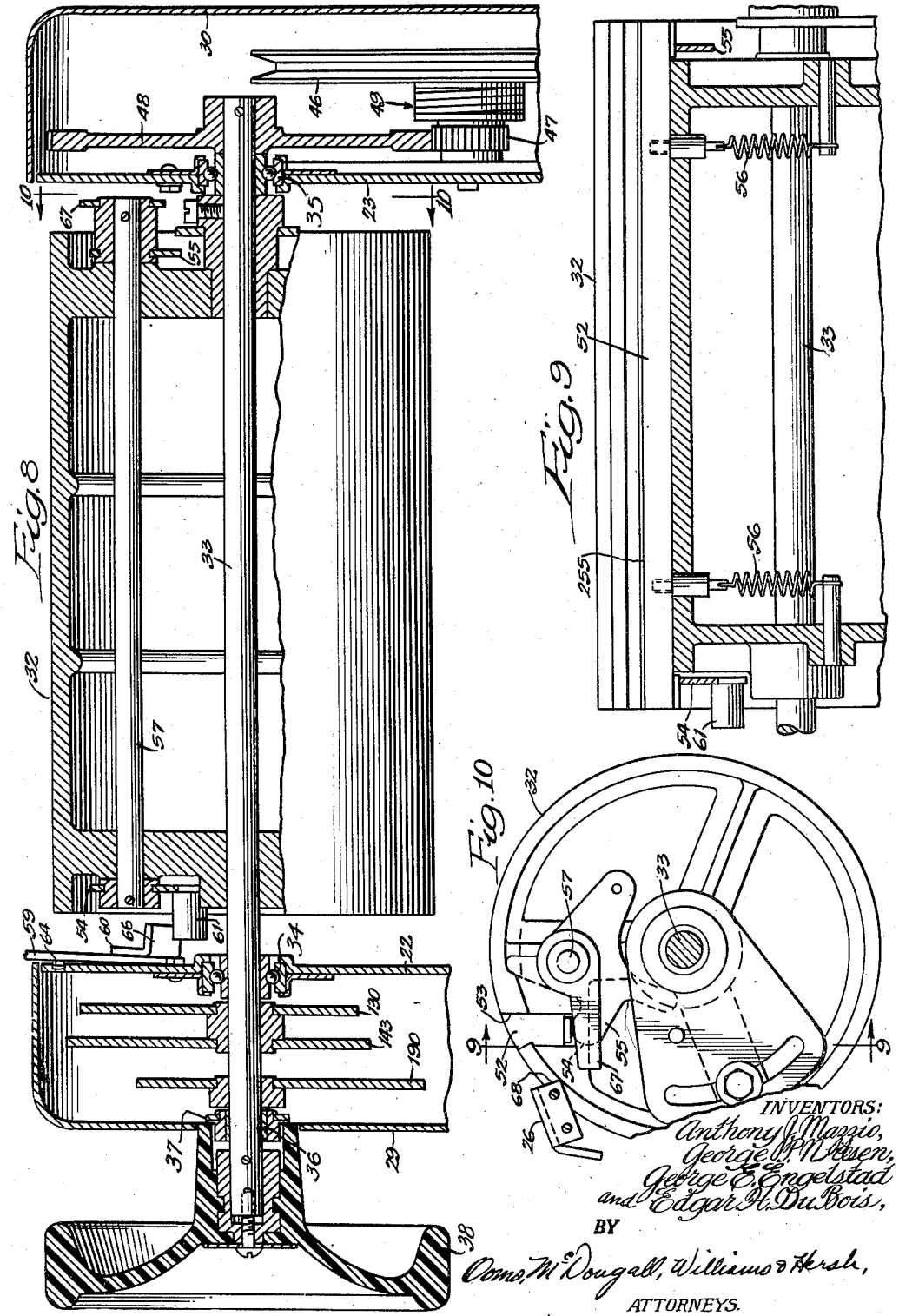

Feb. 4, 1958 A. J. MAZZIO ET AL 2,821,910
MASTER EJECTING MECHANISM FOR DUPLICATORS
Filed May 10, 1954 6 Sheets-Sheet 4
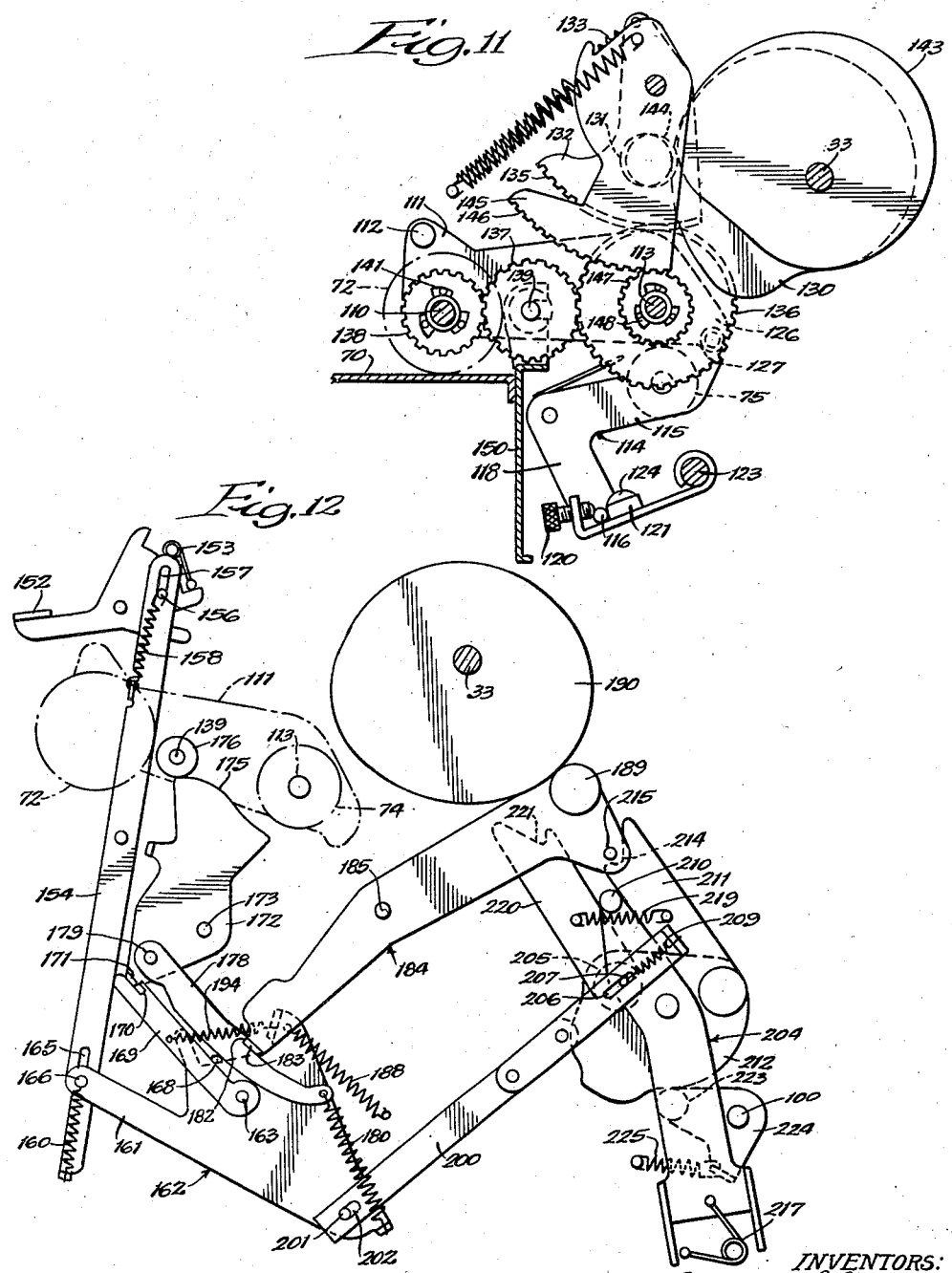
INVENTORS:
Anthony J. Mazzio,
George P. Nilssen,
George E. Engelstad
and Edgar H. Du Bois,
BY Ooms, McDougall, Williams + Hersh,
ATTORNEYS.

Feb. 4, 1958  A. J. MAZZIO ET AL  2,821,910
MASTER EJECTING MECHANISM FOR DUPLICATORS
Filed May 10, 1954  6 Sheets-Sheet 5
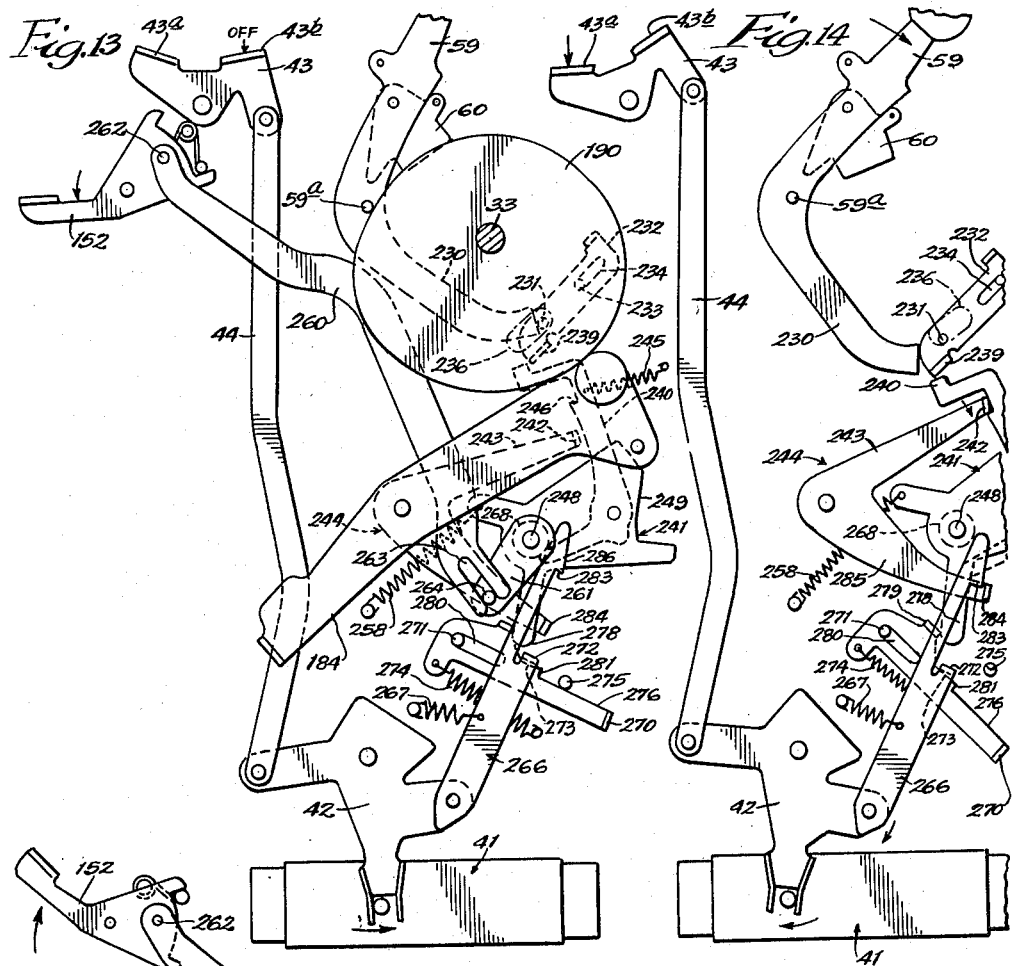
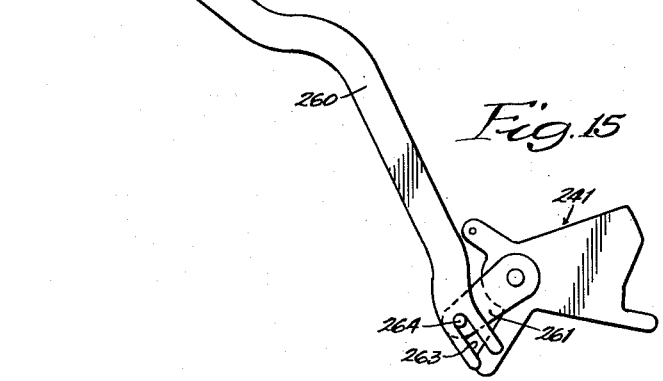
INVENTORS:
Anthony J. Mazzio,
George P. Niesen,
George E. Engelstad
and Edgar H. DuBois,
BY
Owens, McDougall, Williams & Hersh,
ATTORNEYS.

Feb. 4, 1958  A. J. MAZZIO ET AL  2,821,910
MASTER EJECTING MECHANISM FOR DUPLICATORS
Filed May 10, 1954  6 Sheets-Sheet 6
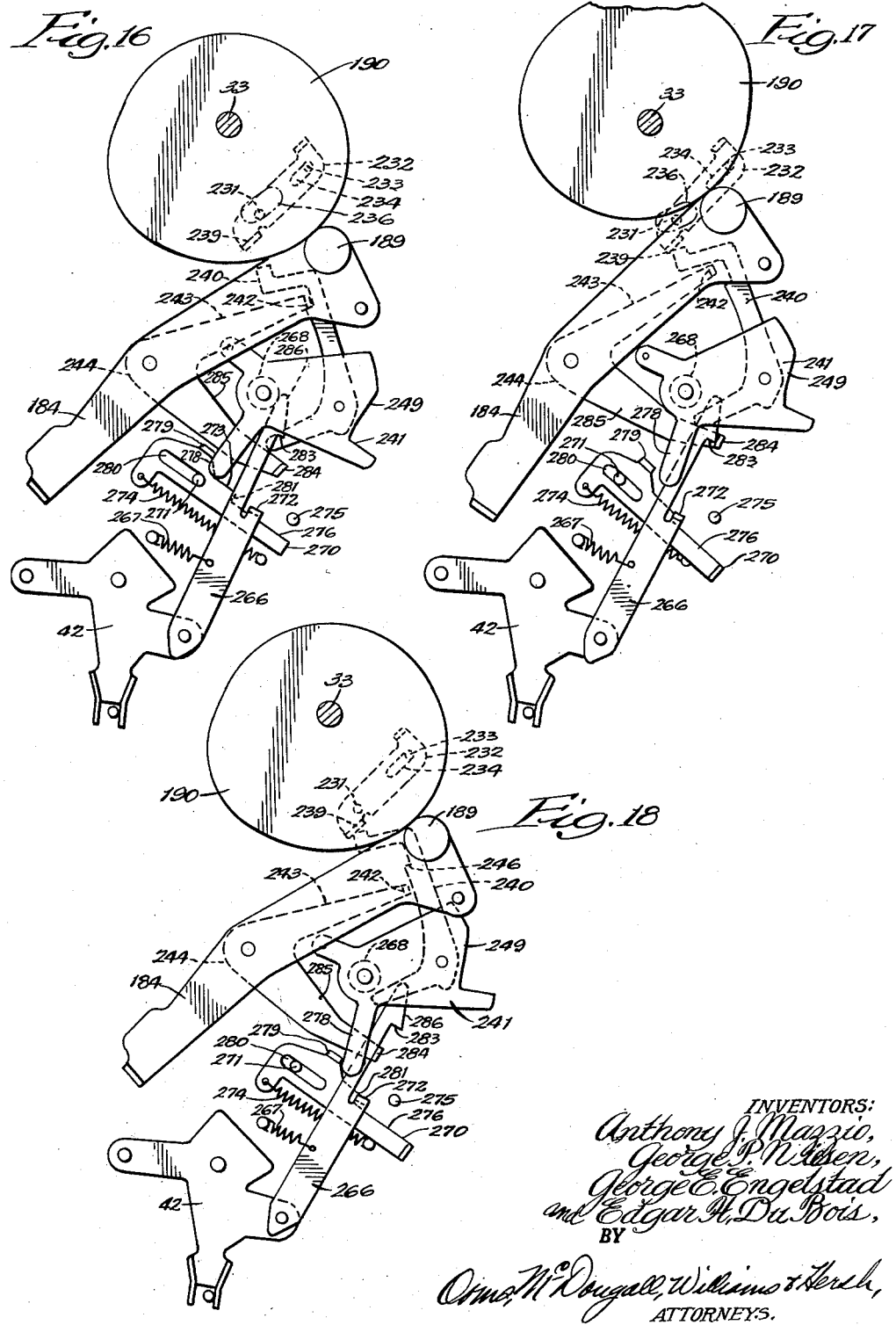
INVENTORS:
Anthony J. Mazzio,
George P. Nielsen,
George E. Engelstad
and Edgar H. DuBois,
BY
Ooms, McDougall, Williams & Hersh,
ATTORNEYS.

United States Patent Office 2,821,910
Patented Feb. 4, 1958

2,821,910

MASTER EJECTING MECHANISM FOR DUPLICATORS

Anthony J. Mazzio, Chicago, George P. Niesen, Niles, and George E. Engelstad and Edgar H. Du Bois, Chicago, Ill., assignors to A. B. Dick Company, a corporation of Illinois Application May 10, 1954, Serial No. 428,421

15 Claims. (Cl. 101—132.5)

This invention relates to duplicating machines, particularly liquid process machines of the type in which copy sheets, moistened with a suitable liquid, are pressed against a master sheet carrying an image composed of suitable inks, dyes or dye forming materials, so that a portion of the image will be transferred to each copy sheet. In machines of this type, the master sheet is usually clamped on a rotatable master cylinder which is engageable by an impression roller. Copy sheets may be fed between the cylinder and the roller by means of a feed mechanism. A receiving tray or the like may be provided to receive the printed copy sheets.

An object of the invention is to provide a duplicating machine having an improved mechanism for releasing the master sheet from the master cylinder so that the master will be ejected into the receiving tray along with the last copy sheet to be printed.

A further object is to provide an improved, motor driven duplicator constructed and arranged so that operation of a control member will eject the master, discontinue the operation of the feed mechanism, retract the impression roller from the cylinder, and discontinue operation of the drive motor.

In this connection, it is another object to arrange the machine so that all of the effort needed to carry out these control functions is supplied by the drive motor, with the result that very little manual effort is required to operate the control member.

Another object of the invention is to provide a master ejecting mechanism which is operative in an improved manner to open the master clamp during one revolution but not during any succeeding revolutions of the cylinder, after the ejection control member has been operated.

Further objects and advantages of the invention will appear from the following description of an illustrative embodiment thereof, taken with the accompanying drawings, in which:

Figure 1 is a general perspective view of an exemplary liquid process duplicator having a master ejecting mechanism constructed in accordance with the invention;

Fig. 2 is an elevational sectional view of the duplicating machine taken generally along a line 2—2 in Fig. 1;

Fig. 3 is a fragmentary elevational sectional view showing the right hand end of the cylinder of the machine and certain details of the master clamp and the master ejecting mechanism, the clamp being shown in closed position;

Fig. 4 is a view similar to Fig. 3, but with the clamp opened for the insertion of a master sheet;

Fig. 5 is a fragmentary elevational view partly in section along a line 5—5 in Fig. 3;

Figs. 6 and 7 are views of the right hand end of the cylinder showing a portion of the master ejecting mechanism in two different stages of operation;

Fig. 8 is an elevational sectional view taken longitudinally through the cylinder generally along a line 8—8 in Fig. 3;

Fig. 9 is another longitudinal sectional view taken through the cylinder, generally along a line 9—9 in Fig. 10;

Fig. 10 is a transverse sectional view taken generally along a line 10—10 in Fig. 8 to show the left hand end of the master cylinder;

Fig. 11 is a somewhat diagrammatic elevational sectional view showing certain details of a power operated feed mechanism for feeding copy sheets into the machine;

Fig. 12 is a somewhat diagrammatic elevational view of a feed control mechanism for initiating and terminating the operation of the feed mechanism and for advancing and retracting the impression roller; and Figs. 13–18 are somewhat diagrammatic elevational views showing certain components of the master ejecting mechanism in various stages of operation.

Various features disclosed in this application are claimed in copending applications, Serial No. 428,422, filed May 10, 1954; Serial No. 438,829, filed June 23, 1954; and Serial No. 444,758, filed July 21, 1954, now U. S. Patent No. 2,789,674.

While a preferred embodiment of the invention is disclosed in this application, it will be understood that there is no intention to limit the invention to the details of such embodiment. Rather, it is the intention to cover all modifications, alternative constructions and equivalents embraced within the spirit and scope of the appended claims.

The preferred form of the invention, shown in the drawings to illustrate but not to limit the invention, is embodied in a power operated liquid process duplicator 20 (Figs. 1 and 2) having a frame 21 comprising a pair of vertical side plates 22 and 23 (Fig. 8) mounted on a base plate 24. A tie bar 26 and one or more tie rods 27 extend between the side plates 22 and 23. Right and left cover pans 29 and 30 are mounted on the side plates 22 and 23.

To hold a master sheet which bears a reverse image printed in a suitable transferable ink, dye or dye forming composition, the machine includes a master cylinder 32 adjustably secured to a shaft 33 which is journaled in bearings 34 and 35 mounted on the side plates 22 and 23. An additional bearing 36, mounted on an outboard bracket 37, supports the outboard right hand end of the shaft 33, which carries a hand wheel 38.

The cylinder 32 is driven by an electric motor 40. Electrical energization of the motor 40 is controlled by a switch 41 (Fig. 13) which is operable by a lever 42 connected to a hand lever 43 by means of a link 44. Finger pieces 43a and 43b are provided on the lever 43 for turning the motor on and off. The motor 40 is belted to a pulley 46 (Fig. 8) which drives a pinion 47 meshing with a gear 48 secured to the cylinder shaft 33. In order that the motor 40 may start without load, an automatically engaging clutch 49 may be connected between the pulley 46 and the pinion 47. Although the clutch may be constructed in any known manner so as to engage when the motor 40 comes up to speed, a particularly advantageous construction is disclosed and claimed in the previously mentioned copending application, Serial No. 444,758, filed July 21, 1954.

The master sheet may be secured to the cylinder 32 by a suitable clamp (Figs. 3–10) illustrated as comprising a clamping bar 52 movable outwardly and inwardly in a longitudinal slot 53 formed in the cylinder. A pair of levers 54 and 55 are arranged to slide the bar 52 outwardly against the bias of springs 56, the levers being fixed to a rockshaft 57. A hand lever 59 is mounted on the right hand side plate 22 by means of a pivot 59a and is provided with a pivoted cam or dog 60 for engaging a roller 61 on the right hand clamp lever 54. A spring 62 is arranged so as to bias the cam 60 against a stop 62a projecting laterally from the lever 59. When it is desired to insert or remove a master sheet, the clamp may be opened by swinging the hand lever 59 clockwise, against the bias of a spring 63, to the position shown in Fig. 4 whereupon a laterally projecting detent member 64 on the hand lever will snap into an aperture 65 formed in the side plate 22 so as to lock the hand lever. The hand wheel 38 is then employed to rotate the cylinder 32 clockwise, which is the reverse of its normal direction of operation, so as to move the roller 61 against the cam 60, whereupon the levers 54 and 55 swing counterclockwise to move the clamp bar 52 outwardly into its open position. When the cylinder is rotated backward, the roller 61 pushes the cam 60 against the stop 62a with increased force, and the stop prevents the cam from yielding. However, the cam 60 yields and hence is ineffective when the cylinder 32 is rotated in the normal direction for printing copy sheets. The backward rotation of the cylinder 32 is limited by the engagement of an arm 67 with a stop 68 at the left hand end of the tie bar 26. The stop arm 67 is secured to the left hand end of the rockshaft 57 so that it swings outwardly when the clamp is opened. The lever 59 may be released by moving it laterally to withdraw the detent projection 64 from the aperture 65. Such lateral movement is resiliently resisted by a spring disk 69 mounted on the pivot 59a. A flanged member 69a extends through a slot 69b in the side plate 22 and is secured to the lever 59 to limit its lateral movement.

To hold a stack of copy sheets, the duplicator 20 is equipped with a suitable feed table 70 (Figs. 1 and 2). The copy sheets are separated from the top of the stack and fed into the machine by means of a power driven feed roller 72 which may be raised and lowered, in a manner to be described shortly, so as to turn the feed off and on. Each copy sheet is advanced by the feed roller 72 between a pair of combination moistening and forwarding rollers 74 and 75. A film of the liquid used in the transfer process is applied to the upper roller 74 by means of a moistener 76 comprising a wick 77 having its upper edge in engagement with the roller 74. The lower portion of the wick 77 extends into a trough 78. A supply of the liquid is maintained at a constant level in the trough by means of a tank 79 mounted in an inverted position with its mouth immersed in the liquid in the trough. The moistener 76 is disclosed and claimed in the previously mentioned copending application, Serial No. 438,829, filed June 23, 1954.

The rollers 74 and 75 are power driven, in a manner to be described below, so as to forward the moistened copy sheet to the master cylinder 32. The copy sheet is pressed against the master sheet on the cylinder 32 by means of an impression roller 81, so that a portion of the image on the master sheet will be leached out by the liquid and transferred to the copy sheet. After passing between the cylinder 32 and the impression roller 81, the copy sheet is deposited in a suitable receiving tray 82.

The impression roller 81 is mounted so that it may be moved into and out of engagement with the master cylinder 32. Moreover, the mounting is such that the pressure between the roller 81 and the cylinder may be regulated.

To these ends, the impression roller 81 is rotatably supported on horizontal arms 86 of bell crank levers 87 (Fig. 2). A spring bar 89 extends between downwardly extending arms 90 on the levers 87. To adjust the pressure on the impression roller, an eccentric 91 is secured to the spring bar 89 at or near its center point. The eccentric 91 is rotatable in an eccentric opening 92 formed in an adjusting disk 93, which is adjustably rotatable in one end of an arm 95. A clamp 96 is provided to lock the disk 93 in its adjusted position. The other end of the arm 95 is formed with a generally semicircular notch 98 adapted to receive a crank 99 formed integrally with a crankshaft 100, the crank 99 being retained in the notch by a thumbscrew 101 mounted on the arm. The crankshaft 100 may be rotated, by means to be described shortly, in order to move the impression roller 81 into and out of engagement with the cylinder 32.

In order to adjust the eccentric 91 the spring bar 89 may be rotated by means of an arm 104 fixed thereto. The arm 104 may readily be adjusted by the operator of the machine, but the eccentric disk 93 is ordinarily adjusted only at the factory or by a serviceman. Thus, the disk 93 may be set to provide a proper range of adjustment for the arm 104.

Returning to the feed mechanism, the feed roller 72 is mounted on a shaft 110 extending between the outer ends of arms 111 which are swingable about the axis of a shaft 113. The upper forwarding and moistening roller 74 is rotatably supported by the shaft 113. A tie rod 112 extends between the arms 111.

The lower forwarding roller 75 is provided with an adjustable spring mounting (Fig. 11), comprising a pair of bell crank levers 114 having upper, generally horizontal arms 115 on which the roller 75 is removably mounted, the levers being pivoted on the side plates 22 and 23. A spring rod 116 extends between downwardly extending arms 118 on the levers 114. The center of the rod 116 is normally held between a thumbscrew 120 and an eccentric disk 121 mounted on an arm 122 which is swingably supported on a tie rod 123 extending between the side plates 22 and 23. When the thumbscrew 120 is loosened the roller 75 may be swung downwardly for easy removal. The eccentric disk 121 is secured to the arm 122 by means of a clamping screw 124 which may be loosened to permit rotary adjustment of the eccentric. With the thumbscrew 120 tightened, the rod 116 is normally bowed so that spring pressure is applied to the roller 75. The amount of bowing may be varied by adjusting the eccentric disk 121. This adjustment need not be disturbed when the roller 75 is removed or replaced.

To separate the forwarding rollers 74 and 75 when the feed roller 72 is raised, the forwardly extending supporting arms 111 are formed with short rearwardly extending lever arms 126 (Fig. 11). Rollers 127 are mounted on the arms 126 for camming engagement with the bell crank levers 114, adjacent their outer ends. Thus the roller 75 is cammed downwardly against the bias of the bow spring 116, when the feed roller 72 is raised.

The feed roller 72 and the forwarding rollers 74 and 75 may be driven by any known or desired means adapted to effect intermittent rotation in timed relation to the rotation of the master cylinder 32. In the illustrated machines, the drive for the feed roller 72 comprises a cam 130 (Fig. 11) secured to the right hand end portion of the cylinder shaft 33. The cam 130 is engaged by a roller 131 on a follower lever 132 which is biased by a spring 133 so that the roller 131 will follow the cam. Formed on the follower lever 132 is a gear sector 135 meshing with a gear 136 which is freely rotatable about an axis coinciding with that of the upper forwarding roller shaft 113. The gear 136 meshes with an idler gear 137 which in turn engages a gear 138 carried by the feed roller shaft 110, the idler 137 being supported on a shaft or pin 139 mounted on one of the roller supporting arms 111. A one-way freewheeling clutch 141 may be provided to connect the gear 138 to the feed roller 72, so that the roller 72 will be driven counterclockwise but not clockwise; the roller also being free to overrun its drive. On the rise of the cam 130, the feed roller 72 is rotated counterclockwise and the topmost copy sheet in the stack is thus advanced into the crotch between the forwarding rollers 74 and 75. The one-way clutch 141 prevents the roller 72 from being driven clockwise on the fall of the cam 130.

Similarly, the drive for the forwarding rollers 74 and 75 comprises a cam 143 engaged by a roller 144 on a spring biased follower lever 145. A gear segment 146 on the lever 145 meshes with a gear 147 which is connected to the upper forwarding roller by means of a one-way freewheeling clutch 148. When the copy sheet is being advanced into the crotch of the rollers 74 and 75, the follower 145 is at a dwell point on the cam 143 so that the rollers are stationary. On the subsequent rise of the cam 143, the roller 74 is driven counterclockwise and the copy sheet is forwarded between the rollers to the crotch of the cylinder 32 and the impression roller 81. On the fall of the cam 143, the one-way clutch 148 prevents the gear 147 from driving the roller 74 clockwise.

To facilitate the positioning of the stack on the feed table 70, a vertically movable stop plate 150 is connected to the arms 111 which support the feed roller 72. When the feed is turned off by raising the feed roller 72, the plate 150 is moved upwardly to serve as a stop against which the leading end of the stack may be positioned. Lowering the feed roller 72 drops the plate below the top of the stack so that the plate does not affect the normal feeding of the copy sheets.

The feed mechanism is controlled by means of an arrangement disclosed and claimed in the previously mentioned copending application, Serial No. 428,422, filed May 10, 1954. Briefly, this control mechanism comprises a hand lever 152 (Fig. 12) which may be swung up and down to turn the feed on and off. An over center spring 153 is effective to hold the lever 152 in either position. The lever 152 is connected to a downwardly extending link 154 by means of a lost motion connection comprising a pin 156, mounted on the lever, and a slot 157 formed in the link to receive the pin. A spring 158 is connected between the pin 156 and the link to bias the link upwardly.

When the feed lever 152 is raised to turn on the feed, the pin 156 pushes the link 154 downwardly. This tensions a spring 160 connected between the lower end of the link 154 and an arm 161 on a many armed control lever or plate 162 mounted on a pivot 163. The link 154 is formed with a lost motion slot 165 for receiving a pin 166 mounted on the arm 161.

The tensioning of the spring 160 tends to swing the control lever 162 counterclockwise with the result that a laterally extending ear 168 on the lever 162 is moved against a latching arm 169 mounted on the pivot 163. A notch 170, formed in the outer end of the latching arm 169, is normally hooked onto a laterally extending ear 171 on a cam lever or plate 172 mounted on a pivot 173. One edge of the lever 172 is formed into a cam 175 which engages a follower roller 176 mounted on the idler gear shaft 139 carried by one of the feed roller supporting arms 111. It will thus be evident that the cam lever 172 is operable to raise and lower the feed roller 72.

The cam plate 172 is actuated by a pawl 178 connected to the lower end of the cam plate by a pivot 179. A spring 180 is connected between the lower end of the pawl and the lower end of the control lever 162, to bias the cam lever 172 counterclockwise. To provide for power actuation of the cam lever 172, the upper edge of the pawl 178 is formed with an undercut latching shoulder 182 adapted to be engaged by a laterally extending ear 183 on the lower end of a follower lever 184 rotatably mounted on a pin 185. A spring 188 biases the lever 184 counterclockwise so that a roller 189 on the lever will follow a cam 190 mounted on the master cylinder shaft 33.

As the master cylinder rotates, the lever 184 oscillates continuously. As the high point of the cam 190 approaches the roller 189, the ear 183 on the lever 184 engages the shoulder 182 and pushes the pawl 178 upwardly so as to swing the cam lever 172 clockwise a sufficient amount to disengage the ear 171 from the notch 170, as shown in Fig. 12. With the latching arm thus released, the control lever 162 is free to be swung counterclockwise by the spring 160. The ear 168 on the lever 162 swings the latching arm 169 counterclockwise, out of the path of the ear 171 on the cam lever 172. On the fall of the cam 190 the pawl 178 moves downwardly with the lower end of the follower lever 184, and the cam lever 172 is thus swung counterclockwise to lower the feed roller 72. Somewhat prior to the low point on the cam 190, the pressure between the ear 183 on the follower lever and the shoulder 182 on the pawl is relieved, whereupon the spring 180 swings the pawl 178 downwardly out of the path of the ear 183. During subsequent duplicating cycles the ear 183 swings alongside the pawl 178 without engaging the shoulder 182.

The feed is turned off by swinging the feed lever 152 counterclockwise. This movement tensions the spring 158 and tends to raise the link 154 and the lever arm 161. As a result, the ear 168 engages the lower edge of the pawl 178 so as to urge the pawl against the ear 183 on the follower lever 184. At the low point on the cam 190, the ear 183 moves below the shoulder 182, whereupon the control lever 162 swings fully clockwise. By means of a biasing spring 194 connected between the latching arm 169 and the lever 162, the latching arm is swung upwardly so that its upper edge engages the ear 171. On the rise of the cam 190, the lever 184 pushes the pawl 178 upwardly and thus swings the cam lever 172 clockwise to raise the feed roller 72. The spring 194 swings the latching arm 169 so as to move the latching notch 170 into the path of the ear 171. Accordingly, on the return stroke of the follower lever 184 the latching engagement between the ear 171 and the notch 170 is restored.

Raising the feed lever 152 is effective not only to lower the feed roller 172 and thus turn on the feed, but also to shift the impression roller 81 into engagement with the master cylinder 32. To control the impression roller 81 a link 200 (Figs. 12–17) is connected to the lower end of the control lever 162 by means of a lost motion connection comprising a pin 201 mounted on the lever 162 and received in a longitudinal slot 202 formed in the lower end of the link 200. The upper end of the link 200 is connected to the upper arm of a snap lever 204 mounted on a pivot 205. The connection between the link 200 and the lever 204 comprises a lost motion slot 206 formed in the link 200 for receiving a pin 207 mounted on the snap lever 204.

It will be recalled that raising the feed lever 152 causes counterclockwise movement of the control lever 162 at the high point of the cam 190. Such movement of the control lever 162 causes upward movement of the link 200. This tensions a spring 209 connected between the upper end of the link 200 and the pin 207, with the result that the snap lever 204 tends to be swung clockwise. However, the snap lever is momentarily restrained by engagement of a pin 210 on its upper end with a pawl 211 which is pivotally mounted at its lower end on a swingable cam plate 212. The cam plate 212 is rotatably mounted on the pivot 205. At its upper end, the pawl 211 is formed with a notch 214 adapted to receive a pin 215 mounted on the follower lever 184. At the high point on the cam 190 the pin 215 is positioned in the notch 214 and thus prevents immediate shifting of the pawl 211. However, on the fall of the cam, the pin 215 retreats upwardly and releases the pawl 211, whereupon the spring 209 snaps the lever 204 fully clockwise, to the position shown in Fig. 17. An over center spring 217 is provided to hold the snap lever 204 in either of its two positions.

The clockwise movement of the snap lever 204 swings the pawl 211 clockwise and tensions a spring 219 connected between the pawl 211 and a second pawl 220 also pivotally mounted on the cam plate 212. The spring 219 swings the pawl 220 clockwise against the pin 215. At the low point of the cam, the spring 219 swings the pawl 220 to its fully clockwise position. A notch 221 at the end of the pawl 220 is thus moved into the path of the pin 215. On the rising part of the cam, the pin 215 pushes the pawl 220 downwardly and thus swings the cam plate 212 counterclockwise. The cam plate 212 is engaged by a roller 223 mounted on a lever 224 which is secured to the right-hand end of the crankshaft 100 controlling the impression roller 81. The cam plate 212 is shaped so that the counterclockwise movement of the plate results in the lever 224 being swung counterclockwise against the bias of a spring 225. The resulting movement of the crank 99 shifts the bow-spring 89 to the left, and thus swings the levers 87 clockwise to raise the impression roller 81 into engagement with the master cylinder 32.

When the feed is turned off by lowering the hand lever 152, the impression roller 81 is withdrawn from the cylinder 32. It will be recalled that this downward movement of the hand lever 152 results in clockwise movement of the control lever 162 somewhat prior to the low point of the cam 190. When thus moved, the control lever 162 pulls the link 200 downwardly and thus shifts the snap lever 204 and the pawls 211 and 220 counterclockwise. The notch 214 in the pawl 211 is thus moved into the path of the pin 215 on the follower lever 184. On the rising part of the cam, the pin 215 shoves the pawl 211 downwardly and thus rotates the cam plate 212 clockwise, permitting the spring 225 to swing the lever 224 clockwise and lower the impression roller 81.

When the desired number of copies has been made, the master sheet may be ejected from the printing cylinder 32 into the receiving tray 82, simply by swinging the clamp operating lever 59 (Figs. 3-5) clockwise to its clamp opening position. This is done while the motor 40 and the feed mechanism continue to operate. The lever 59 is retained in this position by the engagement of the detent 64 with the aperture 65. With the cylinder 32 rotating in its normal direction (counterclockwise), the cam 60 on the clamp lever 59 is not effective to open the master clamp 52 even if the roller 61 engages the cam. Instead, the cam 60 yields and thus swings out of the path of the roller 61.

Formed on the lever 59 is a downwardly extending arm 230 (Figs. 3 and 13) which is engageable with a pin 231 mounted on a slidable operating member or pawl 232. A pin 233 extends through a slot 234 in the member 232 to guide the latter. Further guiding action is provided by an oversize slot 236 formed in the right hand side plate 22 to receive the pin 231. A spring 237 is connected to the slidable member 232 to bias the pin 231 against the lower end of the arm 230 on the lever 59. At the same time, the pin 231 is biased against the lower edge of the slot 236.

Clockwise movement of the clamp operating lever 59 permits the spring 237 to slide the member 232 downwardly, as indicated in Fig. 14, with the result that a laterally extending ear 239 on the member 232 engages the upper end of a pawl 240 pivoted on a swingable cam plate 241. The member 232 swings the pawl 240 into engagement with an ear 242 formed on one arm 243 of a lever 244, which is rigidly secured to the oscillating cam follower lever 184. This movement of the pawl 240 is resisted by a biasing spring 245. At the low point of the cam 190, the ear 242 moves above a shoulder 246 formed on the pawl 240, whereupon the sliding member 232 moves the pawl 240 farther counterclockwise to bring the shoulder 246 into the path of the ear 242, as shown in Fig. 14. Accordingly, the lever 243 shoves the pawl 240 downwardly on the rising part of the cam 190. This movement of the pawl 240 rotates the cam plate 241 clockwise (Fig. 16) about its pivot 248. Formed on the right hand edge of the cam plate 241 is a cam portion 249 engaged by a roller 250 (Figs. 6 and 7) which is mounted on the lower end of a cam lever 251. The clockwise rotation of the cam plate 249 swings the cam lever 251 counterclockwise against the biasing action of a spring 252. An arcuate camming arm 253 on the lever 251 is thus swung into the path of the clamp operating roller 61. As the leading edge of the master sheet held by the clamping bar 52 passes the impression roller 81, the arm 253 cams the roller 61 radially inwardly and thus swings the levers 54 counterclockwise to slide the bar 52 outwardly. The clamping bar 52 is formed with a shoulder 255 which positively ejects the leading edge of the master from the slot 253. As the cylinder 32 continues to rotate, the master is ejected into the receiving tray 82 by centrifugal action and the forwarding action of the impression roller 81. It will be understood that this ejecting action takes place while the last copy sheet is being printed and forwarded into the receiving tray 82.

On the falling part of the cam 190, the cam plate 241 is returned counterclockwise by a biasing spring 258. The pawl 240 remains engaged with the ear 242 until the pressure is released between the ear and the shoulder 246 at the low point of the cam 190, whereupon the spring 245 swings the pawl 240 away from the ear 242 as shown in Fig. 17. It should be explained that the sliding member 232 does not prevent the pawl 240 from being disengaged from the lever 244, since the member 232 is arranged to shift its position as the result of the initial downward movement of the pawl 240. Such movement disengages the upper end of the pawl 240 from the ear 239 so as to permit the member 232 to slide farther downwardly. Thus, on the upward return movement of the pawl 240, its upper end merely engages the lower face of the ear 239 and swings the member 232 upwardly (Fig. 17), such movement being permitted by the oversize slot 236. Accordingly, the member 232 is ineffective to hold the pawl in engagement with the lever 244. This has the result of preventing repeated opening of the clamp 52 during any subsequent revolutions of the cylinder 32.

In order to discontinue operation of the feed mechanism after the master sheet has been ejected, an elongated link 260 is connected between the feed control lever 152 and an arm 261 secured to the cam plate 241. At its upper end, the link 260 is connected to a pivot 262 mounted on the lever 152. A lost motion slot 263 is formed in the lower end of the link 260 to receive a pin 264 mounted on the arm 261. The lost motion provided by the slot 263 is taken up when the feed control lever 152 is swung upwardly to initiate operation of the feed mechanism. When the cam plate 241 is swung clockwise for the purpose of ejecting the master, the arm 261 shoves the link 260 upwardly, as shown in Fig. 15, with the result that the control lever 152 is swung counterclockwise to its "off" position. Such movement of the control lever 152 terminates the operation of said mechanism and causes retraction of the impression roller 81 from the cylinder 32, in the manner already described.

After the master has been ejected and the feed mechanism turned off, the operation of the drive motor 40 is discontinued by means of a switch shutoff mechanism comprising a switch operating pawl 266 (Figs. 13 and 14) which is pivotally connected at its lower end to the switch operating lever 42. A biasing spring 267 tends to swing the pawl counterclockwise against a hub 268 on the pivot 248 for the cam plate 241. When the switch operating lever 42 is swung clockwise to its "on" position the pawl 266 is pulled downwardly along the hub 268, to the position shown in Fig. 14. As the result of such movement of the pawl 266, an operating member or pawl 270 is swung clockwise about a pivot 271. To effect this movement of the member 270, the pawl 266 is formed with an ear 272 which is engageable with a ledge 273 on the member 270. When the switch 41 is turned off, as shown in Fig. 13, a biasing spring 274 swings the member 270 upwardly against a stop pin 275, which is engageable with an upper edge portion 276 of the member 270.

When the cam plate 241 is swung clockwise for the purpose of ejecting the master, the operating member 270 is slid to the left by an arm 278 formed on the cam plate. This arm is engageable with an ear 279 formed on the member 270. Such sliding movement of the member 270 is permitted by a slot 280 formed in the member to receive the pin 271. As the member 270 is slid to the left, the ledge 273 is disengaged from the ear 272, with the result that the member 270 is released for counterclockwise swinging movement toward the stop pin 275, as shown in Fig. 16. On the counterclockwise return movement of the cam plate 241, the arm 278 permits the spring 274 to slide the operating member 270 to the right. A shoulder 281 on the member 270 is thereby engaged with the ear 272 to swing the pawl 266 clockwise. This tends to move a shoulder 283 on the pawl 266 into the path of an ear 284 extending laterally from an arm 285 formed on the oscillating lever 244. However, engagement between the ear 284 and the shoulder 283 is not established on the first counterclockwise return stroke of the lever 244. Instead, the ear engages a ramp 286 (Fig. 17) formed on the pawl 266 above the shoulder 283. On the subsequent clockwise stroke of the lever 244, the ear 284 moves below the shoulder 283, whereupon the spring 274 swings the pawl 266 farther clockwise to move the shoulder into the path of the ear 284 (Fig. 18). On the next counterclockwise return stroke of the lever 244, the arm 285 pulls the pawl 266 upwardly, with the result that the switch lever 42 is swung to its "off" position. The full cycle of delay in the shut-off operation insures that the feed roller 72 will be completely raised and the impression roller completely retracted before the motor 40 is turned off. The upward movement of the pawl 266 disengages the ear 272 from the shoulder 281, whereupon the spring 267 swings the pawl counterclockwise away from the ear 284. In order to reset the operating member 232, the hand lever 59 is returned manually to the position shown in Figs. 3 and 13.

In summarizing the operation of the duplicating machine 20, it will be assumed initially that the feed mechanism and the drive motor 40 are turned off. In preparation for a printing run, a master sheet is installed on the master cylinder 32 by swinging the clamp operating lever 59 clockwise and rotating the hand wheel 38 backward (clockwise). When this is done, the roller 61 abuts against the cam 60 on the arm 59, and the levers 54 are thus swung counterclockwise to move the clamping bar 52 outwardly in its slot 53. The leading edge of the master sheet is then inserted under the clamping bar and the latter is retracted by releasing the clamp operating lever 59 for return movement.

To turn on the drive motor 40, the finger piece 43a is pressed down to swing the rocker 43 (Fig. 3) counterclockwise. This raises the link 44 and swings the switch operating lever 42 clockwise so as to turn on the switch 41. With the motor 40 energized, the master cylinder 32 is continuously rotated.

The feeding of copy sheets is initiated by swinging the feed control lever 152 upwardly. This pushes the link 154 (Fig. 11) downwardly so as to swing the control lever 162 counterclockwise. At the next high point on the control cam 190, the follower lever 184 pushes the pawl 178 upwardly and thus relieves the latching engagement between the ear 171 on the plate 172 and the notch 170 in the latching pawl 169. The control lever 162 thereupon swings the pawl 169 counterclockwise to permit the spring 180 to swing the cam plate 172 counterclockwise on the next falling part of the cam 190. Such movement of the cam plate 172 lowers the feed roller 72 into engagement with the top of the supply stack on the feed table 70.

Before any copy sheets are fed to the master cylinder 32, the impression roller 81 is automatically raised. In moving counterclockwise, the control lever 162 pushes on the link 200 and swings the snap lever 204 clockwise. At the low point of the cam 190, the pawl 220 is thus moved into the path of the pin 215 on the follower lever 184. On the rise of the cam 190, the follower lever 184 shoves the link 220 downwardly and swings the cam plate 212 counterclockwise. As a result, the impression roller crankshaft 100 is rotated counterclockwise whereupon the crank 99 (Fig. 6) swings the levers 87 clockwise and raises the impression roller 81. There is sufficient overtravel of the crank 99 to stress the bow spring 89 so that spring pressure will be applied to the impression roller 81.

When the desired number of copy sheets have been printed, the master sheet may be ejected from the cylinder 32 simply by operating the lever 59 while the feed mechanism and the drive motor 40 remain in operation. The lever 59 is swung clockwise until it is locked by the detent 64. This movement of the lever 59 swings the arm 230 away from the pin 231 and thus permits the spring 237 to slide the operating member or pawl 232 downwardly against the upper end of the pawl 240. As shown in Fig. 14, the member 232 swings the pawl 240 into the path of the ear 242 on the lever 244. On the rise of the cam 190, the lever 244 shoves the pawl 240 downwardly and thereby rotates the cam plate 241 clockwise. This has the result of swinging the cam lever 251 (Figs. 6 and 7) into the path of the clamp operating roller 61. Shortly after the leading edge of the master sheet passes the impression roller 81, the lever 251 opens the clamp 52. Accordingly, the continuing rotation of the cylinder 32 ejects the master sheet into the receiving tray 82.

The clockwise movement of the cam plate 241 discontinues the operation of the feed mechanism by swinging the arm 261 clockwise and thereby pushing the link 260 upwardly. The link 260 swings the feed control lever 152 counterclockwise, as shown in Fig. 15, to its "off" position. This has the result of raising the feed roller 72 and separating the impression roller 81 from the cylinder 32.

On the falling part of the cam 190, the cam plate 241 is returned by the spring 258. At the low point on the cam, the ear 242 moves away from the shoulder 246, whereupon the spring 245 returns the pawl 240 to the position shown in Fig. 17. The member 232 does not prevent the unlatching of the pawl 240 from the ear 242 since this member has by this time moved downwardly during the downward movement of the pawl 240, such downward movement of the member 232 being permitted by the disengagement of the upper end of the pawl 240 from the ear 239 on the member 232. Thus, when the pawl 240 is returned upwardly it merely lifts the member 232, as indicated in Fig. 17. Accordingly, repeated operation of the cam plate 241 and the clamp releasing lever 251 is prevented.

The single cycle of operation of the cam plate 241 has the further effect of shutting off the switch 41 and discontinuing the operation of the drive motor 40. With the switch turned on, the pawl 266 holds the slotted operating member or pawl 270 downwardly, in the position shown in Fig. 14. During the clockwise stroke of the cam plate 241, the arm 278 slides the slotted member 270 to the left and thereby disengages the latch 273 from the ear 272, whereupon the member 270 swings back toward the stop pin 275, as shown in Fig. 16. On the counterclockwise return stroke of the plate 241, the arm 278 permits the spring 274 to slide the member 270 to the right. The shoulder 281 engages the ear 272 on the pawl 266 so as to swing the pawl toward the ear 284 on the lever 244. However, the ear 284 misses the shoulder 283 on the pawl 266 during the first counterclockwise stroke of the lever 244. On the subsequent clockwise stroke of the lever 244, the ear 284 rides down the ramp 286 and moves under the shoulder 283 as shown in Fig. 18. The ear 284 catches the shoulder 283 on the next counterclockwise stroke of the lever 244 and thereby raises the pawl 266, with the result that the switch 41 is turned off.

The upward movement of the pawl 266 disengages the ear 272 from the shoulder 281, whereupon the pawl 266 is swung away from the ear 284 into engagement with the hub 268. At the same time, the spring 274 returns the member 270 to the position shown in Fig. 13.

After the drive motor 40 has stopped, the clamp operating lever 59 remains in its set position. Thus, the master clamp 52 may be opened simply by manually rotating the cylinder 32 backward. After a new master has been inserted under the clamping bar 52, the clamp operating lever 59 is returned counterclockwise to the position shown in Fig. 3.

This operation slides the member 232 to the right and upwardly, with the result that the ear 239 is moved behind the upper end of the pawl 240. Accordingly, subsequent movement of the lever 59 to the position shown in Fig. 4 will initiate another master ejecting operation.

It will be apparent that the motor driven cam 190 supplies all of the effort necessary to eject the master sheet and carry out the accompanying functions of discontinuing the feeding of copy sheets, withdrawing the impression roller, and shutting off the drive motor. Moreover, the machine automatically carries out these functions in the proper timed relationship. These factors eliminate the need for any substantial exertion on the part of the operator and greatly simplify the correct operation of the machine.

Various modifications and alternative constructions may be employed, without departing from the scope of the invention, as described above and defined in the following claims.

We claim:

1. In a duplicating machine, the combination comprising a rotatable master cylinder, an impression roller mounted for movement between a cylinder engaging position and a retracted position, feeding means for feeding copy sheets between said cylinder and said roller, said feeding means having disabling means for disabling operation thereof, power driving means for rotating said cylinder, said driving means having disabling means for disabling operation thereof, master securing means movable on said cylinder between a master securing position and a master releasing position, first means operable to shift said master securing means between master securing and master releasing positions and thereby eject the master, to operate said disabling means of said feeding means, to move said impression roller to retracted position, and to operate said disabling means of said driving means, a manually movable control element, and second means operable by said control element to establish an operating connection between said driving means and said first means.

2. In a duplicating machine, the combination comprising a rotatable master cylinder, an impression roller mounted for movement between a cylinder engaging position and a retracted position, feeding means for feeding copy sheets between said cylinder and said roller, said feeding means having disabling means for disabling operation thereof, power driving means for rotating said cylinder, said driving means having disabling means for disabling operation thereof, master securing means movable on said cylinder between a master securing position and a master releasing position, first means operable to shift said master securing means between master securing and master releasing positions and thereby to eject the master, a manually movable control element, second means operable by said control element to establish an operating connection between said driving means and said first means, third means operable in response to operation of said first means for operating said disabling means of said feeding means and for moving said impression roller to retracted position, and fourth means operable subsequently to said third means and in response to operation of said first means for operating said disabling means of said driving means.

3. In a duplicating machine, the combination comprising a rotatable master cylinder, an impression roller mounted for movement between a cylinder engaging position and a retracted position, feeding means for feeding copy sheets between said cylinder and said roller, said feeding means having disabling means for disabling operation thereof, power driving means for rotating said cylinder, said driving means having disabling means for disabling operation thereof, master securing means movable on said cylinder between a master securing position and a master releasing position, a cam rotatable by said cylinder, cam follower means oscillable by said cam, a manually movable control member, first means responsive to movement of said control member and operable by said cam follower means during movement thereof in one direction for moving said master securing means between master securing and master releasing positions to eject the master from said cylinder, second means responsive to operation of said first means and operable by said cam follower means for operating said disabling means of said feeding means and for moving said impression roller between cylinder engaging and retracted positions, and means responsive to movement of said control member and operable by said cam follower means during subsequent movement thereof for operating said second disabling means of said power driving means.

4. In a duplicating machine, the combination comprising a rotatable master cylinder, an impression roller for engaging said cylinder, power driving means for rotating said cylinder, said driving means having disabling means for disabling operation thereof, master securing means movable on said cylinder between a master securing position and a master releasing position, a cam rotatable by said cylinder, cam follower means oscillable by said cam, a manually movable control member, a pawl movable into and out of the path of said cam follower means, a movable element operable in response to movement of said control member for moving said pawl into the path of said cam follower means, master ejecting means operable by said pawl for shifting said master securing means between master securing and master releasing positions to eject the master from said cylinder, said movable element being movable beyond its pawl actuating position to an inactive position upon movement of said pawl away from said movable element by said cam follower means, resilient means for disengaging said pawl from said cam follower means after a single oscillatory cycle thereof, a second pawl connected to said disabling means of said power driving means and movable into and out of the path of said cam follower means, and means operable by said master ejecting means for moving said second pawl into the path of said cam follower means to actuate said second pawl and thereby disable operation of said driving means.

5. In a duplicating machine, the combination comprising a rotatable master cylinder, an impression roller for engaging said cylinder, power driving means for rotating said cylinder, said driving means having disabling means for disabling operation thereof, master securing means movable on said cylinder between a master securing position and a master releasing position, a cam rotatable by said cylinder, cam follower means oscillable by said cam, a manually movable control member, a first pawl movable into and out of the path of said cam follower means, a second pawl operable in response to movement of said control member for moving said first pawl into the path of said cam follower means, master ejecting means operable by said first pawl for moving said master securing means between master securing and master releasing positions and thereby ejecting the master from said cylinder, said second pawl being movable beyond its pawl actuating position to an inactive position upon movement of said first pawl away from said second pawl by said cam follower means, resilient means for disengaging said first pawl from such cam follower means after a single oscillatory cycle thereof, a third pawl for operating said disabling means of said driving means, said third pawl being movable into and out of the path of said cam follower means, and a fourth pawl operable by said master ejecting means for shifting said third pawl into the path of said cam follower means for actuation thereby to disable said driving means.

6. In a duplicating machine, the combination comprising a rotatable master cylinder, an impression roller mounted for movement between a cylinder engaging position and a retracted position, feeding means for feeding copy sheets between said cylinder and said roller, said feeding means having disabling means for disabling operation thereof, power driving means for rotating said cylinder, said driving means having disabling means for disabling operation thereof, master securing means movable on said cylinder between a master securing position and a master releasing position, a cam rotatable by said cylinder, cam follower means oscillable by said cam, a manually movable control member, a first pawl movable into and out of the path of said cam follower means, a second pawl operable in response to movement of said control member for moving said first pawl into the path of said cam follower means for actuation thereby, master ejecting means operable by said first pawl for moving said master securing means between securing and releasing positions and thereby effecting ejection of the master from said cylinder, said second pawl being movable beyond its pawl actuating position to an inactive position upon movement of said first pawl away from said second pawl by said cam follower means, means for disengaging said first pawl from said cam follower means after a single oscillatory cycle thereof, means operable by said master ejecting means during said cycle for operating said disabling means of said feeding means and moving said roller between cylinder engaging and retracting positions, a third pawl movable into and out of the path of said cam follower means and connected to said disabling means of said driving means, and a fourth pawl operable by said master ejecting means for shifting said third pawl into the path of said cam follower means for actuation thereby to disable said driving means.

7. In a duplicating machine, the combination comprising a rotatable master cylinder, an impression roller mounted for movement between a cylinder engaging position and a retracted position, feeding means for feeding copy sheets between said cylinder and said roller, said feeding means having disabling means for disabling operation thereof, power driving means for rotating said cylinder, said driving means having disabling means for disabling operation thereof, master securing means movable on said cylinder between a master securing position and a master releasing position, cyclical actuating means operable by said driving means, manually operable control means, first means operable by said actuating means in response to operation of said control means to move said master securing means between securing and releasing positions during a first cycle of said actuating means and thereby eject the master from said cylinder, second means operable during said first cycle by said actuating means in response to operation of said control means for operating said disabling means of said feeding means and for moving said impression roller between cylinder engaging and retracting positions, and third means operable by said actuating means in response to operation of said control means for operating said disabling means of said driving means, said third means including time delay means for delaying operation of said last mentioned disabling means until a subsequent cycle of said actuating means.

8. In a duplicating machine, the combination comprising a rotatable master cylinder, an impression roller for engaging said cylinder, master securing means movable on said cylinder between a master securing position and a master releasing position, cam means rotatable by said cylinder, cam follower means oscillable by said cam means, a pawl movable into and out of the path of said follower means, manually movable control means for moving said pawl into the path of said cam follower means for actuation thereby, and means operable by said pawl for moving said master securing means between securing and releasing positions as the master is passing the impression roller, the master thereby being ejected from said cylinder.

9. In a duplicating machine, the combination comprising a rotatable master cylinder, an impression roller for engaging said cylinder, master securing means movable on said cylinder between a master securing position and a master releasing position, a cam rotatable by said cylinder, cam follower means oscillable by said cam, a manually movable control member, a pawl movable into and out of the path of said cam follower means, means operable by said manually movable member for moving said pawl into the path of said cam follower means for actuation thereby, and means operable by said pawl for moving said master securing means between securing and releasing positions in timed relationship to rotation of said cylinder and immediately after said securing means passes said impression roller, the master thereby being ejected from said cylinder.

10. In a duplicating machine, the combination comprising a rotatable master cylinder, an impression roller for engaging said cylinder, master securing means movable on said cylinder between a master securing position and a master releasing position, a cam rotatable by said cylinder, a cam follower oscillable by said cam, a pawl movable into and out of the path of said cam follower, means biasing said pawl out of the path of said cam follower, manually movable means for moving said pawl into the path of said cam follower, a second cam oscillable by said pawl, and a camming element operable by said second cam for shifting said master securing means between securing and releasing positions as said securing means passes said roller.

11. In a duplicating machine, the combination comprising a rotatable master cylinder, an impression roller for engaging said cylinder, master securing means movable on said cylinder between a master securing position and a master releasing position, a cam continuously rotatable with said cylinder, a cam follower continuously oscillable by said cam, manually operable control means for establishing an operative connection between said cam follower and said master securing means to move said securing means between securing and releasing positions so that the master will be ejected from said cylinder after said securing means passes said roller.

12. In a duplicating machine, the combination comprising a rotatable master cylinder, an impression roller for engaging said cylinder, master securing means movable on said cylinder between a master securing position and a master releasing position, actuating means operatively connected to said cylinder for oscillation thereby, a pawl movable into and out of the path of said actuating means, a manually operable member movable between master retaining and master releasing positions, an intermediate operating element movable in response to movement of said member to said releasing position for shifting said pawl into the path of said actuating means for operation thereby, said actuating means being operative to move said pawl and thereby release said operating element for additional movement to an inactive position out of operating relation with said pawl to prevent repeated movement of said pawl, and means operable by said pawl for moving said master securing means between securing and releasing positions after said securing means passes said roller.

13. In a duplicating machine, the combination comprising a rotatable master cylinder, an impression roller for engaging said cylinder, means for rotating said cylinder in one direction to print copy sheets, master securing means movable on said cylinder between master securing position and master releasing position, said securing means having a cam follower element for effecting movement thereof between said positions, a manually movable control member, first camming means operable in response to movement of said control member for operating said follower element as said securing means passes said roller with said cylinder rotating in said one direction, the master sheet thereby being ejected by said cylinder, yieldable second camming means operable by said control member for actuating said follower element at a different point in response to rotation of said cylinder in a direction opposite to said one direction, said yieldable camming means being yieldably movable during rotation of said cylinder in said one direction to prevent actuation of said follower element by said yieldable camming means, and means for manually rotating said cylinder in said opposite direction to actuate said follower element and thereby move said master securing means to releasing position, said securing means thereby being conditioned for receiving a new master.

14. In a duplicating machine, the combination comprising a rotatable master cylinder, an impression roller for engaging said cylinder, means for rotating said cylinder in one direction to print copy sheets, master securing means movable on said cylinder between master securing position and master releasing position, said securing means having a cam follower element for effecting movement thereof between said positions, a manually movable control member, a cam rotatable with said cylinder, cam follower means continuously oscillable by said cam, first camming means for actuating said cam follower element of said securing means, means operable by movement of said control member to establish an operating connection between said cam follower means and said first camming means to move said securing means to master releasing position after said securing means passes said roller with said cylinder rotating in said one direction, the master thereby being ejected from said cylinder, a yieldable one-way camming pawl connected to said control member and movable therewith into the path of said follower element of said securing means to actuate said follower element at a different point in response to the rotation of said cylinder in a direction opposite to said one direction, said one-way pawl being yieldably movable to provide for free passage of said follower element during rotation of said cylinder in said one direction, and means for manually rotating said cylinder in said opposite direction to actuate said follower element and thereby move said securing means to master releasing position, said securing means thereby being conditioned to receive a new master.

15. In a duplicating machine, the combination comprising a rotatable master cylinder, an impression roller for engaging said cylinder, means for rotating said cylinder in one direction to print copy sheets, master securing means movable on said cylinder between master securing position and master releasing position, said securing means having a cam follower element for effecting movement thereof between said positions, a manually movable control member, first releasing means connected to said control member for moving said securing means to master releasing position in response to operation of said control means followed by rotation of said cylinder in a direction opposite to said one direction to bring said master securing means to a point substantially spaced from said impression roller, said master securing means thereby being conditioned to receive a master, second releasing means for moving said master securing means to master releasing position in response to operation of said control member followed by rotation of said cylinder in said one direction to move said securing means past said roller, the master thereby being ejected from said cylinder, and means rendering said first releasing means ineffective during rotation of said cylinder in one direction.

References Cited in the file of this patent

UNITED STATES PATENTS

| | | |
|---|---|---|
| 2,002,321 | Kluitman | May 21, 1935 |
| 2,003,469 | Ritzerfeld | June 4, 1935 |
| 2,185,188 | Flanigan | Jan. 2, 1940 |
| 2,231,639 | Ritzerfeld | Feb. 11, 1941 |
| 2,238,359 | Copeland et al. | Apr. 15, 1941 |
| 2,262,511 | Morrison | Nov. 11, 1941 |
| 2,380,744 | Ford | July 31, 1945 |